C. W. KANOLT.
PHOTOGRAPHIC METHOD AND APPARATUS.
APPLICATION FILED JAN. 16, 1915.

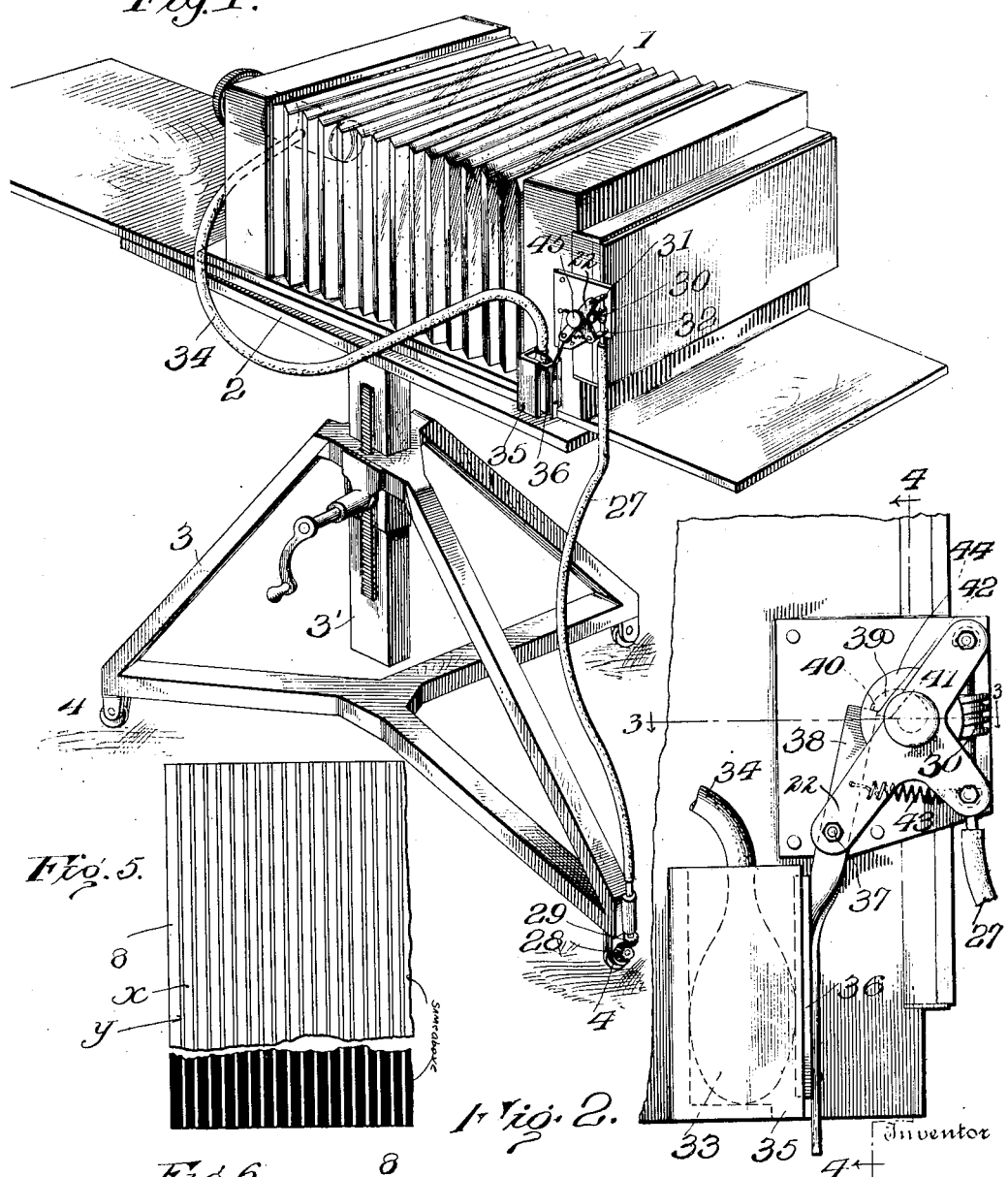

1,260,682.

Patented Mar. 26, 1918.
2 SHEETS—SHEET 2.

Witnesses
W. A. Williams
R. W. Brown

Inventor
Clarence W. Kanolt
By Robertson & Johnson
Attorneys

UNITED STATES PATENT OFFICE.

CLARENCE W. KANOLT, OF WASHINGTON, DISTRICT OF COLUMBIA.

PHOTOGRAPHIC METHOD AND APPARATUS.

1,260,682.    Specification of Letters Patent.    Patented Mar. 26, 1918.

Application filed January 16, 1915. Serial No. 2,628.

*To all whom it may concern:*

Be it known that I, CLARENCE W. KANOLT, a citizen of the United States, and a resident of Washington, in the District of Columbia, have invented certain new and useful Improvements in Photographic Methods and Apparatus, of which the following is a specification.

My invention relates to a photographic method and to apparatus for carrying it out, both said method and apparatus being directed to the production of changeable pictures or grounds therefor which are to be viewed through the ordinary line screen made up of alternate transparent or translucent and opaque lines or through light deflecting and magnifying means such as the corrugated screen illustrated in the drawings of my Patent No. 1,050,374, Aug. 17, 1915, or through other suitable means for determining and varying the parts of the picture which shall be visible under given conditions. The object of the present invention is to obtain such pictures by photographing actual continuous movements of objects and to devise apparatus adequate to carry out this method.

To this end my invention consists in the subject matter described in the specification, one embodiment of which, so far as the apparatus is concerned, is illustrated in the drawings, and set forth in the appended claims.

Referring to the drawings:

Figure 1 is a perspective view of the apparatus which is a camera with which certain additional devices have been associated but which is very slightly changed from the usual camera.

Fig. 2 is a detail side elevation showing parts of the operating devices.

Fig. 5 is an elevation of a line screen, parts being broken away, and no attempt being made to draw it to scale, and Fig. 6 is a plan of a line screen and of a sensitized plate spaced therefrom for ease of illustration, parts being broken away.

Figure 3:
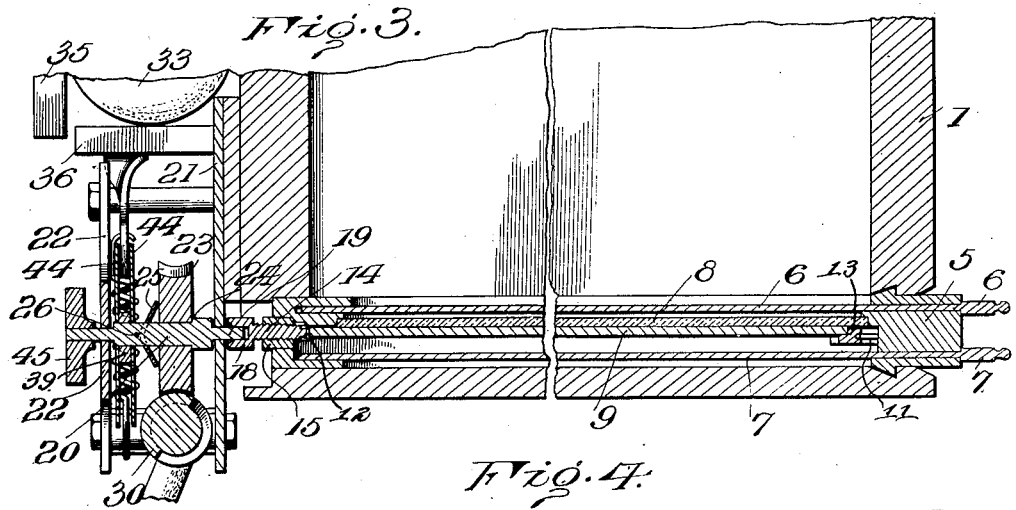
Fig. 3 is a horizontal section on the line 3—3, Fig. 2.

Before describing the apparatus, I will refer to the process. Pictures of this sort are divided into a series of fields of vision over which the line of vision sweeps, when the relative position of the observer and the picture changes or when there is relative movement between the picture and the screen. Under any given relation of picture, screen and observer, the points on one set of lines of vision in these fields are visible, the rest being hidden. As the relative position changes, the position of the lines of vision changes and another set of points is seen. My method locates upon these sets of points, in their successive order, representation of continuous motions of an object or a part thereof and enables me to photograph such continuous motions in the proper positions in each of the various restricted areas which I have referred to as fields of vision. My method involves changing during actual exposure the relative position of the following elements: the lens of the camera, the sensitized surface and the screen which is of the broad general character above referred to and which is adjacent to and in front of said surface, that is, the position of at least one of these must change with respect to one or more of the others. As carried out by the embodiment of my apparatus illustrated herein, the sensitized surface, which is shown as an ordinary photographic plate, is given transverse movement with reference to the lens and screen during exposure, but the vital feature of the method is effecting the change, whatever it may be, during the actual exposure.

In the method as carried out by the embodiment of my apparatus herein illustrated, the screen, whether a line screen or a screen made up of lenses or a screen of the desired character however constructed, permits the light to fall upon restricted areas only of the sensitized surface but these areas are continuously changed during the exposure. When the picture is viewed through a screen of either sort, a stereoscopic image is obtained if during the taking of the picture relative motion is produced between the object being photographed and the camera, such that the angle from which the object would be viewed from the position of the camera changes. This will be clear from the following considerations. Wherever the observer is while viewing the picture, each of his eyes is at a point corresponding to one location of the camera during actual exposure. These locations are for a given position of the observer just the angular distance apart that his eyes are. As he moves through a series of such positions, this remains true for both his eyes at each position and he sees stereoscopically. In case of small objects, it is easier to place them on a rotating table, the camera being stationary. In the case of larger objects, it is ordinarily easier to move the camera. Means by which the movement of the camera and that of the sensitized surface are synchronized or co-ordinated and made to correspond and the beginning and ending of the exposure determined is illustrated in the drawings. It is obvious, however, that this is only one means for accomplishing this portion of the method. Others may serve to correlate the relative movement between the lens, screen and sensitized surface and relative movement between the object and camera, or if desired both of these movements with the shutter operating devices.

Figure 4:
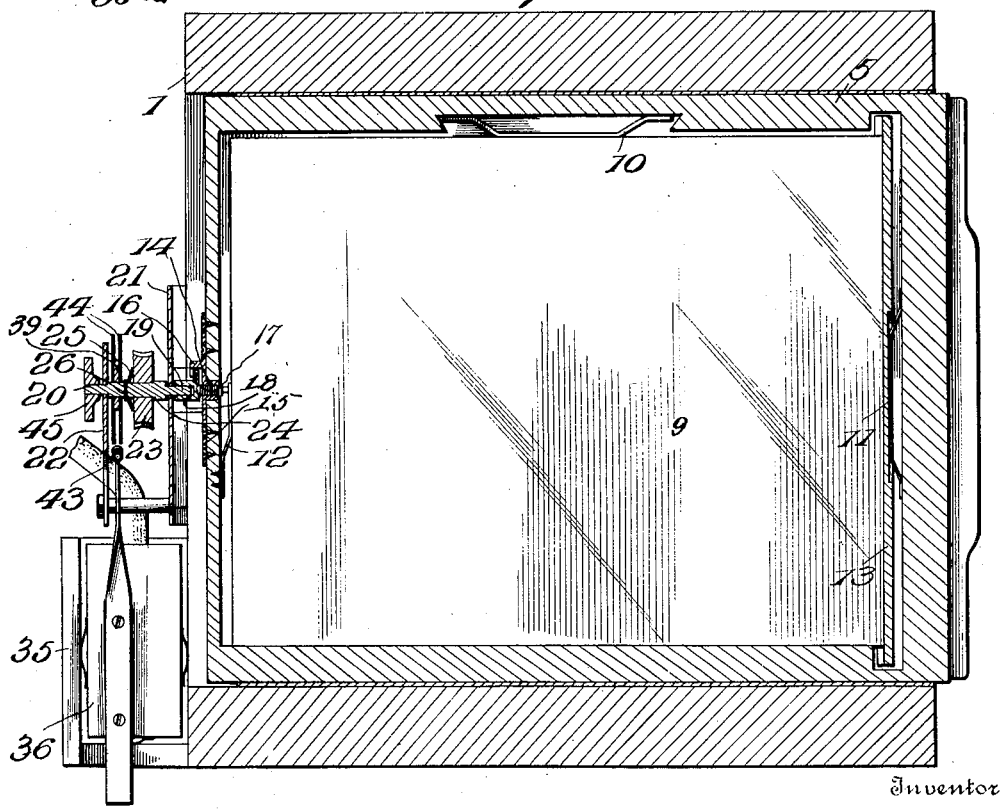
Fig. 4 is a vertical section on the line 4—4, Fig. 2.

Referring to the apparatus: This may take a wide range of forms, but in the embodiment chosen to illustrate this part of my invention the camera 1 mounted on a table 2 is supported on a base or tripod 3 provided with rollers 4 which may run on a track which is the arc of a circle of which the object to be photographed is the center, or the yokes in which they turn may be fixed to effect the same purpose. The usual adjustments and other ordinary features need not be described. For some purposes the camera may remain stationary. The camera is provided with a plate holder 5 of substantially the usual construction and having the slides 6—7 between which is located the screen 8 which I have shown as fixed and which is preferably a line screen, although it may be made up of parallel cylindrical lenses as by pressing corrugations into celluloid, or be of other suitable construction but which, however constructed, is provided with suitable means for determining and varying the parts of the sensitized surface which shall be accessible to light under given conditions. In Figs. 5 and 6 I have shown a line screen having the opaque lines $x$ and the intermediate transparent lines $y$, the opaque lines being for convenience of illustration shown as very broad. This screen though shown as a fixed plate may be movable, though I prefer to keep it fixed and move the sensitized surface 9 instead. This surface is illustrated as an ordinary photographic plate having the coating $z$ held in position adjacent to and just in rear of the screen 8, by springs 10 at the top, 11 at the side and 12 at the opposite side. As will be seen from Fig. 4, the spring 11 acts against a follower strip 13 which in turn engages the edge of the plate 9. The spring 12 has its free end located opposite to and constituting a contact piece for the screw 14 which co-acts with a similar screw-threaded plate 15 secured to the end of the plate holder. This plate has a projection 16 which constitutes a stop for a lug 17 projecting from one side of the head 18 of the screw 14. It will be apparent that this screw is removable with the plate holder. It has in its head an irregular cavity for co-action with the end 19 of the shaft 20 which drives the screw and which is mounted for rotation in plates 21—22 secured to the side of the camera. It will be apparent that the sensitized plate is accurately held and that by turning the screw it may be moved gradually and continuously toward the right as shown in Fig. 4, space at the ends of the plate being allowed for that purpose. It will also be obvious that such motion will gradually change the areas hidden by the screen so that parts of the sensitized surface inaccessible to light at the beginning of the exposure will be progressively and continuously uncovered and that the whole plate may thus be utilized in taking, on the said restricted areas, a picture of an object which is moving or a part of which is moving, the basic representation of said object and the successive variants thereof showing continuous movement of said object or part when the picture is viewed through a screen placed in front of it which successively reveals said representation and variants as change occurs in the relative position of said picture, screen and observer.

The fact that it is often desirable to cause relative movement between the object being photographed and the camera during exposure has already been pointed out, as has also the importance of establishing a definite relation between this movement and that of the moving plate or other moving part in the camera. This may be accomplished in the apparatus herein illustrated by providing operative connections between one of the rollers 4 and a worm wheel 23 frictionally held on the shaft 20 against a shoulder 24 thereof by the spring washer 25 retained in position by the pin 26. These connections are shown as comprising a flexible shaft 27 having on one end a bevel gear 29 meshing with a bevel gear 28 fixed to the roller 4 for movement therewith and on the other the worm 30 mounted in bearings 31— 32 and meshing with the worm wheel 23. It will be obvious that as the camera moves the shaft 20 will be turned through the connections specified and that the screw 14 will thus be turned and the plate moved endwise. It is sometimes desirable to control the opening and closing of the shutter automatically and means is illustrated for accomplishing this by the movement of the camera, the exposure being begun very shortly after the shaft 20 begins to turn and being terminated as soon as the entire surface has been exposed. Pneumatically operating means for closing and opening a shutter on successive impulses given by squeezing a bulb is well known and need not be described or illustrated except diagrammatically. The bulb 33 and tube 34 represent parts of such well known means, the bulb being supported in a squeeze box 35, one side of this box 36 being pivoted at 37 and having an extension 38 through which the box is operated by the shaft 20, which carries a cam 39 fast thereto. This cam has abrupt faces 40—41 between which is a shoulder 42 against which the extension 38 is yieldingly held by a spring 43. In order to maintain the extension in proper relation to the cam, guides here shown as disks 44 may be employed. Obviously I am not limited to the means shown or indeed to pneumatic shutter operating devices. I prefer to move the camera through about 60° and to make the pitch of the screw 14 and the gearing such that during this movement of 60° the plate will be shifted substantially the width of one of the areas above referred to. It is obvious that movement of the camera may be produced by a motor which may be driven at various speeds as desired.

The fact that the worm wheel 23 is frictionally held on the shaft 20 makes it possible to turn said shaft by hand through the milled head 45 without interfering with said connection.

Whether the screen be a line screen or a corrugated screen it has a series of means for transmitting light and a series of means for excluding light, the members of one of said series alternating with the members of the other. The screen thus divides the sensitized surface into two series of areas, the members of which alternate and are respectively accessible and inaccessible to light. These areas are narrow strips, preferably vertical. The position of these strips on the sensitized surface changes gradually and continuously during actual exposure. It is thus possible to photograph all visible parts of the object at once and to obtain successive but continuously varied images of each part, thereby recording the motion of the object if it have any.

From the following considerations it will be apparent that my process does not result in objectionable inequalities of exposure. In the preferred form of screen the lines are straight, vertical, parallel and equally spaced. During exposure the photographic plate is moved behind the screen (or the screen moved in front of the photographic plate) preferably at a uniform rate. The distance the plate moves is nearly or quite equal to the distance between the centers of two adjacent lines. If it is moved exactly the distance between the lines every part of the plate is exposed for the same length of time, for over each point of the plate there passes a single transparent line, or parts of two lines such that the sum of the widths of the two parts is equal to the width of a single line. This would be true whether the transparent parts were narrow relative to the opaque or not. I prefer, however, to make the transparent lines relatively narrow, this being a well known arrangement.

The operation of the apparatus is as follows: The plate holder having been loaded in the ordinary way, is placed in the camera, the end socket of the head 18 fitting over the end 19 of the shaft 20. When the camera has been properly focused and the slide 6 removed, it is moved toward the left as shown in Fig. 1 and, through the connections driven by the roller 4, the shaft 20 turns moving the shoulder 42 out from under the extension 38 which permits the spring 43 to squeeze the bulb 33 by means of the side 36 of the squeeze box, thus operating the shutter opening mechanism and starting the exposure. The rotation of the shaft 20 continues and by turning the screw 14 gradually and continuously moves the sensitized plate with reference to the screen thus continuously changing the areas of the plate which are accessible to the light entering the camera. This movement continues until the plate has moved over substantially the width of one of said restricted areas at which time the shaft 20 having completed a rotation brings the cam 39 back to its original position and then permits the extension 38 to be moved once more by the spring 43 to operate the shutter, this time to close it, thus terminating the exposure.

The negative thus produced is used to make a positive which when viewed through a suitable screen as above described, exhibits the continuous motion registered by my process.

While I prefer that the relative movement between the lens, screen and sensitized surface should be continuous, I do not, except as specified in certain claims, limit myself to continuous movement.

What I claim as my invention is:

1. The photographic method comprising the following steps, exposing in a camera a sensitized surface having in front of it means permitting the light to fall simultaneously upon a plurality of separated restricted areas only of said sensitized surface, and during actual exposure progressively changing the relative position of at least one of said elements and the lens of the camera.

2. The photographic method comprising the following steps, exposing in a camera a sensitized surface having in front of it a screen permitting the light to fall at a given moment upon a plurality of restricted areas only of said sensitized surface, and during actual exposure continuously changing the relative position of at least one of said elements and the lens of the camera.

3. The photographic method comprising the following steps, simultaneously exposing a plurality of restricted areas only of a sensitized surface, and during actual exposure changing the position of said restricted areas on said surface.

4. The photographic method comprising the following steps, dividing a sensitized surface into a series of alternate narrow strips respectively accessible and inaccessible to light, and during actual exposure varying the position of said areas on said surface.

5. The photographic method comprising the following steps, exposing a sensitized surface having in front of it a line screen, and during actual exposure continuously changing the relative position of said surface and screen.

6. The photographic method of making a changeable picture to be viewed through a screen of the character described, comprising the following steps, exposing in a camera a sensitized surface having in front of it a screen of the character described, and during actual exposure changing the relative position of at least one of said elements and the lens of the camera.

7. The photographic method of making a changeable picture to be viewed through a screen having the characteristic of causing the light to fall upon restricted areas only for any one position of the ground, screen and observer, comprising the following step, photographically and continuously locating on the points which would be seen through said screen for each of several different relative positions of the ground, screen and observer, the corresponding component parts of the picture being taken.

8. The method of producing a negative for a ground for a changeable picture to be viewed through a screen having the characteristic of causing the light to fall upon restricted areas only for any one relative position of the ground, screen and observer comprising the following steps, photographing the object upon a sensitized surface through a screen having the like characteristic, and during actual exposure changing the relative position of one of said elements and the lens thus changing the restricted areas on which the light may fall.

9. The method of making a photographic negative for a changeable picture comprising the following steps, interposing between the lens of the camera and a sensitized surface a screen having the characteristic of causing the light to fall upon restricted areas only of said surface, exposing said sensitized surface, and causing relative movement between said lens, surface and screen during actual exposure to vary the location of the said areas as the relative movement is effected.

10. The photographic method comprising the following steps, simultaneously exposing a plurality of restricted areas only of a sensitized surface, during actual exposure causing relative movement between the camera and the object being photographed, and during said actual exposure correspondingly changing the position of said restricted areas on said surface.

11. The method of making a photographic negative for a changeable picture comprising the following steps, interposing between the lens of the camera and a sensitized surface a screen having the characteristic of causing the light to fall at a given moment upon restricted areas only of said surface, simultaneously exposing a plurality of said restricted areas, causing relative movement between said lens, surface and screen during actual exposure to vary the location of the said areas as the relative movement is effected, and at the same time causing relative movement between the camera and the object being photographed.

12. The photographic method comprising the following steps, exposing in a camera a sensitized surface having in front of it means dividing the sensitized surface into narrow strips, simultaneously exposing a plurality of said strips, changing the relative position of the camera and the object being photographed, and while this change is being effected and during actual exposure progressively changing the relative position of at least one of said elements and the lens of the camera.

13. The photographic method comprising the following steps, exposing in a camera a sensitized surface having in front of it a screen permitting the light to fall at a given moment upon separated restricted areas only of said sensitized surface, during actual exposure continuously changing the relative position of at least one of said elements and the lens of the camera, and at the same time causing relative circular movement between the camera and the object being photographed.

14. The method of making a photographic negative for a changeable picture comprising the following steps, interposing between the lens of the camera and a sensitized surface a screen having the characteristic of causing the light to fall at a given moment upon restricted areas only of said surface, exposing said sensitized surface, causing relative movement between said lens, surface and screen during actual exposure to vary the location of the said areas as the relative movement is effected, and at the same time causing relative movement between the camera and the object being photographed.

15. A photographic camera adapted to contain a sensitized surface and comprising a lens, a screen adjacent and in front of said surface and dividing the same into two series of areas, the members of which alternate and are respectively accessible and inaccessible to light, and means for producing during actual exposure continuous relative movement between said surface, screen and lens.

16. A photographic camera adapted to contain a sensitized surface and comprising a lens, a screen adjacent and in front of said surface and dividing the same into a series of alternate narrow strips respectively accessible and inaccessible to light, means for maintaining said plate and screen in correct relative position, and means for producing during actual exposure relative movement between said surface and screen.

17. A photographic camera adapted to contain a sensitized surface and comprising a lens, a screen in front of and adjacent said sensitized surface and provided with means for dividing the same into a series of alternate areas respectively accessible and inaccessible to light, and means operated by and at the same time with relative movement between the camera and the object being photographed for producing relative movement between said surface screen and lens substantially the width of one of said areas during substantially the said relative movement between the camera and object.

18. A photographic camera adapted to contain a sensitized surface and comprising a lens, a line screen adjacent and in front of the said sensitized surface, the latter two being relatively movable with respect to each other, shutter operating devices, and coördinated means acting upon said shutter operating devices for initiating the exposure, for continuously and progressively causing such relative movement during actual exposure, and for terminating said exposure.

19. A photographic camera adapted to contain a sensitized surface and comprising a lens, a screen in front of and adjacent said sensitized surface and provided with means for dividing the same into a series of alternate areas respectively accessible and inaccessible to light, said lens, surface and screen being relatively movable, shutter operating devices, and coördinated means acting upon said shutter operating devices for initiating the exposure for continuously and progressively causing such relative movement during actual exposure, and for terminating said exposure.

20. A photographic camera adapted to contain a sensitized surface and comprising a lens, a screen adjacent and in front of said sensitized surface and dividing it into narrow strips, means for operating the shutter of the camera, and means operatively connected with said shutter operating means for controlling the same and for causing relative movement during actual exposure between said sinsitized surface, screen and lens.

21. A photographic camera adapted to contain a sensitized surface and comprising a lens, a screen adjacent and in front of said sensitized surface and provided with means for dividing the same into a series of alternate areas respectively accessible and inaccessible to light, means for operating the shutter of the camera, and means operatively connected with said shutter operating means for controlling the same and for causing relative movement during actual exposure between said sensitized surface, screen and lens.

22. A photographic camera adapted to contain a sensitized surface and comprising a lens, a screen adjacent and in front of said sensitized surface and having a series of means for transmitting light, and a series of means for excluding light, the members of one of said series alternating with those of the other, means for operating the shutter of the camera, and means operatively connected with said shutter operating means for controlling the same and for causing relative movement during actual exposure between said sensitized surface, screen and lens, said last named means being driven at the same time with relative movement between the camera and the object being photographed.

23. In a photographic camera, means for holding a plate yieldingly in place, a screw operatively related to said plate, an operating shaft for said screw, driven means frictionally retained on said shaft, means for driving said driven means, and manual means for setting said shaft.

24. In a photographic camera, means for holding a plate yieldingly in place, a screw operatively related to said plate, an operating shaft for said screw, a cam on said shaft, shutter operating devices in operative relation to said cam, and means for turning said shaft.

25. In a photographic camera, means for holding a plate yieldingly in place, a screw operatively related to said plate, an operating shaft for said screw, a cam on said shaft, a squeeze box constituting part of shutter operating mechanism and having an extension, means for yieldingly holding said extension in operative relation to said cam on said shaft, means for guiding it associated with said cam, and worm gearing for driving said shaft.

26. A photographic camera comprising a plate holder adapted to contain a sensitized plate, and a screen adjacent to and in front of said plate in said holder, one of said parts being yieldingly held for edgewise movement in the holder, a screw mounted in said holder in operative relation to an edge of said part, and a driving shaft for said screw rotatably mounted on the camera, and having a part with which said screw is disconnectably connected when the holder is in place in the camera.

27. A camera adapted to contain a sensitized surface and comprising a lens, a screen adjacent and in front of said sensitized surface and dividing it into narrow strips, means for causing relative movement between the camera and the object being photographed to be circular, shutter operating devices, and operative connections correlating the circular movement and the movement of said shutter operating devices.

28. A camera adapted to contain a sensitized surface and comprising a lens, a screen adjacent and in front of said sensitized surface, means for enabling relative revolution between the camera and the object being photographed to take place, shutter operating devices, operative connections between said means for enabling relative revolution to take place and said shutter operating devices, means for changing during actual exposure the relative position of said surface, lens and screen, and operative connections between said last mentioned means and the means for enabling relative revolution to take place, both said shutter operating devices and said means for changing the relative position being controlled by and their motion coördinated with the motion of said means for causing relative revolution to take place.

29. A photographic camera adapted to contain a sensitized surface and comprising a lens, a screen adjacent and in front of the sensitized surface and having relatively long and narrow alternating means respectively transmitting and excluding light and dividing the sensitized surface into narrow strips which alternate and are respectively accessible and inaccessible to light, a support for said camera, a traction wheel on said support, shutter operating devices, means for giving progressive relative movement to said lens, screen and surface, and operative connections between said traction wheel and said shutter operating devices and said means for giving relative movement, said devices, means and connections being constructed, proportioned and related to coördinate the motions of said shutter operating devices and said means for giving relative movement, whereby as the camera support is moved the shutter opens, relative movement between the lens, screen and sensitized surface starts and continues during a given travel of the camera when the shutter closes and the relative movement ceases.

30. A photographic camera adapted to contain a sensitized surface and comprising a lens, means for dividing said sensitized surface into series of restricted areas respectively accessible and inaccessible to light, means for varying the position of said areas on said surface during exposure, shutter operating devices, and correlated operating means for said shutter operating devices and said means for varying the position of the areas.

31. A photographic camera comprising a holder adapted to contain a plate, means for holding said plate yieldingly for edgewise movement in the holder, a screw mounted in said holder in operative relation to an edge of said plate and a driving shaft for said screw rotatably mounted on the camera with its end in registry with said screw to constitute a driving connection therewith when the holder is in place, said holder and screw being freely movable endwise to disengage said connection.

32. A photographic camera adapted to contain a sensitized surface and comprising a lens, a screen of the broad general character described, the apparatus being adapted to permit relative movement between the camera and the object, means for producing relative movement between the lens, screen and sensitized surface, and means for correlating the latter movement with the former.

33. A photographic camera adapted to contain a sensitized surface and comprising a lens, a screen adjacent and in front of said surface and provided with means dividing the same into a plurality of separated areas simultaneously accessible to light and a plurality of separated areas simultaneously inaccessible to light, and means for producing during actual exposure relative movement between said surface, screen and lens.

In testimony whereof I affix my signature in presence of two witnesses.

CLARENCE W. KANOLT.

Witnesses:
S. H. SHINNIE,
JOHN L. FLETCHER.